(12) United States Patent
Testa et al.

(10) Patent No.: US 9,112,636 B2
(45) Date of Patent: Aug. 18, 2015

(54) ADD AND DROP SWITCH/AGGREGATOR FOR OPTICAL COMMUNICATIONS NETWORKS

(75) Inventors: Francesco Testa, Pomezia (IT); Mauro Rudi Casanova, Carugate (IT); Antonio D'Errico, Calci (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 44 days.

(21) Appl. No.: 14/116,726

(22) PCT Filed: Nov. 21, 2011

(86) PCT No.: PCT/EP2011/070543
§ 371 (c)(1),
(2), (4) Date: Jan. 9, 2014

(87) PCT Pub. No.: WO2012/152343
PCT Pub. Date: Nov. 15, 2012

(65) Prior Publication Data
US 2014/0126904 A1    May 8, 2014

(30) Foreign Application Priority Data
May 10, 2011 (EP) .................................... 11165498

(51) Int. Cl.
*H04J 14/00* (2006.01)
*H04J 14/02* (2006.01)
*H04Q 11/00* (2006.01)

(52) U.S. Cl.
CPC ......... *H04J 14/0212* (2013.01); *H04J 14/0217* (2013.01); *H04Q 11/0005* (2013.01); *H04Q 2011/0016* (2013.01); *H04Q 2011/0039* (2013.01); *H04Q 2011/0058* (2013.01)

(58) Field of Classification Search
CPC ............. H04J 14/0212; H04J 14/0217; H04Q 11/0005; H04Q 2011/0016; H04Q 2011/0039; H04Q 2011/0058
USPC .......................................................... 398/83, 48
See application file for complete search history.

(56) References Cited

U.S. PATENT DOCUMENTS

| 6,115,517 A | 9/2000 | Shiragaki et al. |
| 2006/0171717 A1* | 8/2006 | Kikuchi .......................... 398/83 |
| 2010/0129082 A1 | 5/2010 | Zhong et al. |

FOREIGN PATENT DOCUMENTS

WO    WO-00/76252    12/2000

OTHER PUBLICATIONS

Sohma, et al., "Silica-based PLC Type 32×32 Optical Matrix Switch", *Optical Communications, 2006. ECOC 2006.* European Conference on, (2006), 2 pages.

(Continued)

*Primary Examiner* — M. R. Sedighian
(74) *Attorney, Agent, or Firm* — Nicholson De Vos Webster & Elliott, LLP (57) ABSTRACT

An apparatus for an optical communications network comprising a demultiplexer, a plurality of add/drop optical switches for adding and dropping wavelength channels. The add/drop optical switches arranged in a matrix with a number of rows corresponding to a number of output ports of the demultiplexer and a number of columns corresponding to a number of transponders. Each drop optical switch has an express input port associated with an output port of the demultiplexer, a drop output port associated with an individual transponder, and an express output port. Each add optical switch has an express input port, an add input port associated with an individual transponder, and an express output port. The apparatus also comprises a multiplexer with a plurality of input ports associated with express output ports of the add/drop optical switches.

15 Claims, 5 Drawing Sheets

(56) References Cited

OTHER PUBLICATIONS

PCT International Search Report for PCT Counterpart Application No. PCT/EP2011/070543 (Feb. 14, 2012), 4 pages.
Colburne, et al., "ROADM Switching Technologies," *Proceeding of OFC 2011, paper OTuD1* (Mar. 6-10, 2011), 43 pages.
Dong, et al., "Low power and compact reconfigurable multiplexing devices based on silicon microring resonators," *Optics Express*, vol. 18, No. 10, (May 10, 2010), 7 pages.
Gringeri, et al., "Flexible Architectures for Optical Transport Nodes and Networks," Communications Magazine, *IEEE* (vol. 48, Issue: 7), (Jul. 2010), 11 pages.
Jensen, et al., "Colourless, Directionless, Contentionless ROADM Architecture Using Low-Loss Optical Matrix Switches," *ECOC 2010, 36th European Conference and Exhibition on Optical Communication*, (Sep. 19-23, 2010), 3 pages.
Poon, et al., "Cascaded Microresonator-Based Matrix Switch for Silicon On-Chip Optical Interconnection," *Proceedings of the IEEE* (vol. 97, Issue: 7), (Jul. 2009), pp. 1216-1238.

\* cited by examiner

Control OFF

Fig. 5b

Control ON

Fig. 5c

Control ON With Add & Drop Function

Fig. 6a

Control OFF

Fig. 6b

Control ON

Fig. 7

ADD AND DROP SWITCH/AGGREGATOR FOR OPTICAL COMMUNICATIONS NETWORKS

CROSS-REFERENCE TO RELATED APPLICATIONS

This application is a National stage of International Application No. PCT/EP2011/070543, filed Nov. 21, 2011, which claims priority to European Application No. 11165498.4, filed May 10, 2011, which are hereby incorporated by reference.

TECHNICAL FIELD

The present invention relates to optical communications networks, in general, and in particular to an Add and Drop Switch/Aggregator (ADSA) for use in a reconfigurable optical add-drop multiplexer (ROADM).

BACKGROUND

In current ROADM flexibility is only provided in handling wavelength channels coming from the network (by-pass wavelengths also known as express traffic) that can be remotely configured at each node to be routed from any direction to any direction. But at the end points the add and drop wavelengths are rigidly assigned to a fixed direction and can only be reconfigured manually.

Next generation ROADM will be more flexible with respect to the currently deployed optical nodes. New ROADM will have colourless, directionless and contentionless features so as to extend the flexibility and automation to the end points where normally the transponders are connected to the node. In new nodes it will be possible without any manual intervention to change the configuration of add/drop wavelength channels to/from any direction (directionless operation), independently from the transponder wavelength (colourless operation) and by allowing multiple signals with the same wavelength to be handled by the same add and drop structure (contentionless operation).

The dynamic colourless, directionless and contentionless add/drop access will give the operator the possibility to optimize the resources utilization, eliminate manual intervention, support re-routing functions in case of faults in a cost effective way. To add such flexibility to the existing ROADMs that uses the free space optics based 1×N wavelength selective switching (WSS) for optical line switching, new architectures have been presented and illustrated in this document in FIG. 1. The architecture illustrated in FIG. 1 allows for the colourless, directionless and contentionless operation thanks to the use of an additional element named Add and Drop Switch and Aggregators block (ADSA). Three main possible realizations have been discussed in the literature for ADSA:

1) Solution based on arrays of 1×N WSS in conjunction with arrays of 8×1 space switching as disclosed in P. Colbourne, B. Collings: '*ROADM Switching Technologies*' *Proceeding of OFC* 2011, *paper OTuD1*.
2) Solution presented in FIG. 5 of S. Gringeri et al: '*Flexible Architectures for Optical Transport Nodes and Networks*' *IEEE Communication Magazines*, July 2010, which is based on distribute-switch-select architecture in which splitters/combiners are used in conjunction with 1×N optical switches and tunable filters.
3) Solution presented in R. Jensen, A. Lord and N. Parsons: '*Colourless, Directionless, Contentionless ROADM Architecture Using Low-Loss Optical Matrix Switches*', *Proceeding of ECOC* 2010 *paper Mo.2.D.2* in which ADSA blocks include high port count OXC based on free space optics and MEMS technology.

All these proposed architectures are not satisfactory: the architecture 1 has low losses but has the disadvantage of high cost, room occupancy and complexity due to the high number of WSS (wavelength selective switches) in the array that increases scaling the transponder count. The architecture 2 has the disadvantage of high losses that increase scaling the transponder count, due to signal distribution and switching. This leads to increase of ROADM cost, footprint and power consumption (needs of optical amplification). The architecture 3 has the disadvantage of high cost and large footprint due to the use of 3D MEMS (microelectromechanical systems) technologies with the related complex control circuitry.

SUMMARY

It is the object of the present invention to obviate at least some of the above disadvantages and provide an improved Add and Drop Switch/Aggregator (ADSA) for use in a reconfigurable optical add-drop multiplexer (ROADM).

Accordingly, the invention seeks to preferably mitigate, alleviate or eliminate one or more of the disadvantages mentioned above singly or in any combination.

According to a first aspect of the present invention there is provided an apparatus for an optical communications network comprising a demultiplexer and a first plurality of drop optical switches for dropping wavelength channels arranged in a first matrix. In the first matrix a number of rows corresponds to a number of output ports of the demultiplexer and a number of columns corresponds to a number of transponders. Each drop switch has an express input port associated with a single output port of the demultiplexer, a drop output port associated with an individual transponder and an express output port. The apparatus further comprises a second plurality of add optical switches arranged in a second matrix for adding wavelength channels. Each add optical switch has an express input port adapted to receive a comb of wavelengths, an add input port adapted to receive a single wavelength to be added to the comb of wavelengths and an output port. The second matrix comprises a number of columns that corresponds to the number of transponders.

According to a second aspect of the present invention there is provided an apparatus for an optical communications network comprising a demultiplexer, a plurality of add/drop optical switches for adding and dropping wavelength channels. The add/drop optical switches are arranged in a third matrix with a number of rows corresponding to a number of output ports of the demultiplexer and a number of columns corresponding to a number of transponders. Each add/drop optical switch has an express input port associated with an output port of the demultiplexer, an add input port associated with an individual transponder, a drop output port associated with an individual transponder and an express output port. The apparatus further comprises a multiplexer with a plurality of input ports associated with express output ports of the add/drop optical switches.

According to a third aspect of the present invention there is provided a reconfigurable optical add-drop multiplexer comprising an apparatus comprising a demultiplexer and a first plurality of drop optical switches for dropping wavelength channels arranged in a first matrix. In the first matrix a number of rows corresponds to a number of output ports of the demultiplexer and a number of columns corresponds to a number of transponders. Each drop switch has an express input port associated with a single output port of the demultiplexer, a drop output port associated with an individual transponder and an express output port. The apparatus further comprises a second plurality of add optical switches arranged in a second matrix for adding wavelength channels. Each add optical switch has an express input port adapted to receive a comb of wavelengths, an add input port adapted to receive a single wavelength to be added to the comb of wavelengths and an output port. The second matrix comprises a number of columns that corresponds to the number of transponders. Alternatively, the reconfigurable optical add-drop multiplexer comprises an apparatus having a demultiplexer, a plurality of add/drop optical switches for adding and dropping wavelength channels. The add/drop optical switches are arranged in a third matrix with a number of rows corresponding to a number of output ports of the demultiplexer and a number of columns corresponding to a number of transponders. Each add/drop optical switch has an express input port associated with an output port of the demultiplexer, an add input port associated with an individual transponder, a drop output port associated with an individual transponder and an express output port. The apparatus further comprises a multiplexer with a plurality of input ports associated with express output ports of the add/drop optical switches.

According to a fourth aspect of the present invention there is provided a telecommunications network comprising an apparatus which has a demultiplexer and a first plurality of drop optical switches for dropping wavelength channels arranged in a first matrix. In the first matrix a number of rows corresponds to a number of output ports of the demultiplexer and a number of columns corresponds to a number of transponders. Each drop switch has an express input port associated with a single output port of the demultiplexer, a drop output port associated with an individual transponder and an express output port. The apparatus further comprises a second plurality of add optical switches arranged in a second matrix for adding wavelength channels. Each add optical switch has an express input port adapted to receive a comb of wavelengths, an add input port adapted to receive a single wavelength to be added to the comb of wavelengths and an output port. The second matrix comprises a number of columns that corresponds to the number of transponders.

Further features of the present invention are as claimed in the dependent claims.

BRIEF DESCRIPTION OF THE DRAWINGS

The present invention will be understood and appreciated more fully from the following detailed description taken in conjunction with the drawings in which.

DETAILED DESCRIPTION

Photonic Integration has the highest potential in the implementation of devices with low power consumption (due to miniaturization and high level of integration), high level of integrability, low cost and high capacity.

The elementary integrable photonic building blocks of the novel proposed Add and Drop Switch and Aggregator (ADSA) are:
  The AWG (arrayed waveguide grating) demultiplexer;
  T1 switch element used to drop wavelength channels to transponder RX (see FIGS. 5a-5c);
  T2 switch element used to add wavelength channels from transponder TX (see FIGS. 6a-6b).

Figure 5A:
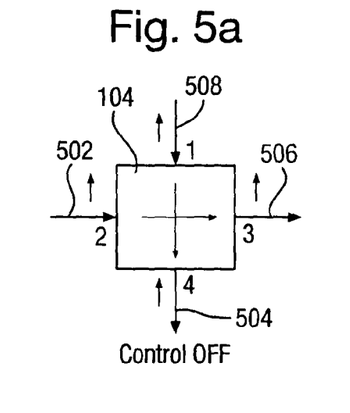
FIGS. 5a-5c are diagrams illustrating an optical switch used in embodiments of the present invention.
Figure 5B:
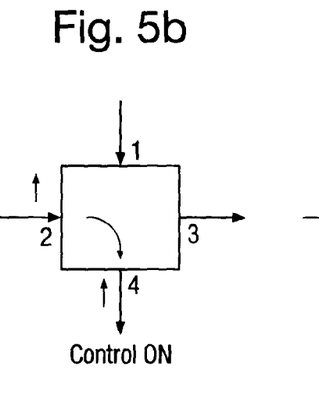
Figure 5C:
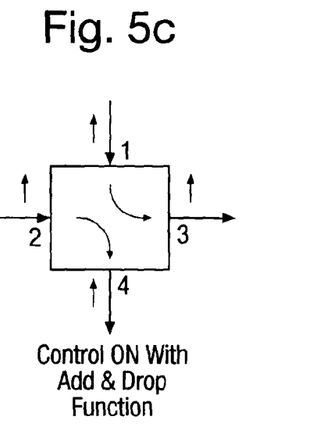

T1 switch has four unidirectional ports, two for input and two for output. One fixed wavelength is received at input 2 and if it has to be dropped to a transponder not associated with the current switch element, the wavelength proceeds to output 3. A different wavelength that has to be dropped to the transponder associated with the current switch element is simultaneously received at input 1 and it proceeds down toward its designated transponder via output 4 as depicted in FIG. 5a. If the wavelength received at input 2 is associated with the current switch element then the control is activated and the wavelength is switched to output 4 toward its designated transponder (see FIG. 5b). In this last situation no signal is allowed to be received at input 1 because one and only one wavelength must be dropped to each transponder. Operation of the switch T1 as shown in FIG. 5c allows for implementing it for add and drop functions. When control of the switch is in ON state wavelength received at input 502 is dropped at output 504 and wavelength received at input 508 is added to output 506. For this function two implementations are possible: the Wavelength Selective Photonic Switch element as reported in A. W. Poon, X. Luo, F. Xu and H. Chen: 'Cascaded Microring-Based Matrix Switch for Silicon On-Chip Optical Interconnection', Proceeding of the IEEE, Vol. 97, N. 7, July 2009 or the Broadband Photonic Switch Element based on Mach-Zehnder interferometers (MZI) as reported in S. Sohma et al: 'Silica-based PLC Type 32×32 Optical Matrix Switch' Proceeding of ECOC 2006.

Figure 6A:
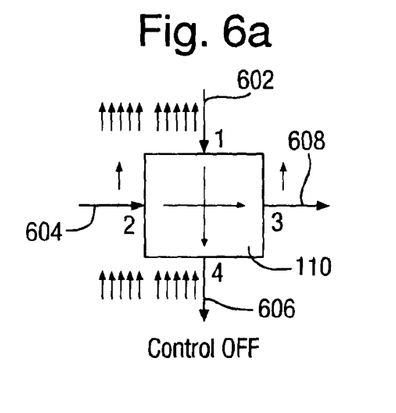
FIGS. 6a-6b are diagrams illustrating an optical switch used in the first embodiments of the present invention.
Figure 6B:
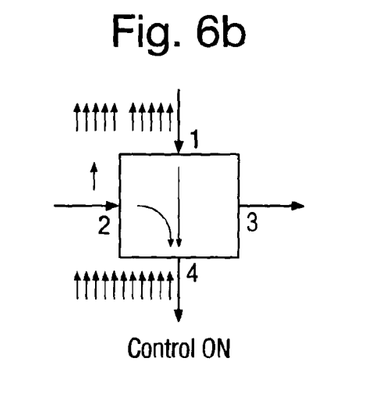

The switch T2 and its operation of adding a wavelength from a transponder to a line is shown in FIGS. 6a-6b. The T2 switch has four unidirectional ports, two for input and two for output. A comb of wavelengths is received at the input 1, 602, and it always proceeds toward the output port 4, 606. Simultaneously a single wavelength from a tunable laser (with variable wavelength) is received at input 2, 604, and in absence of the switch control it goes toward output port 3, 608, see FIG. 6a. When the switch control is activated the wavelength is routed to output port 4, 606, to be combined with the wavelength comb. As mentioned earlier, the wavelength received at input port 1, 602, is forwarded to output port 4, 606, see FIG. 6b. The T2 switch element is tuned to the corresponding laser wavelength. A possible implementation of this switch element is the Tunable Selective Photonic Switch elements and it is in reported in P. Dong et alii: 'Low power and compact reconfigurable multiplexing devices based on silicon microring resonators', Optics Express, Vol. 18, N. 10, 10 May 2010.

Figure 2:
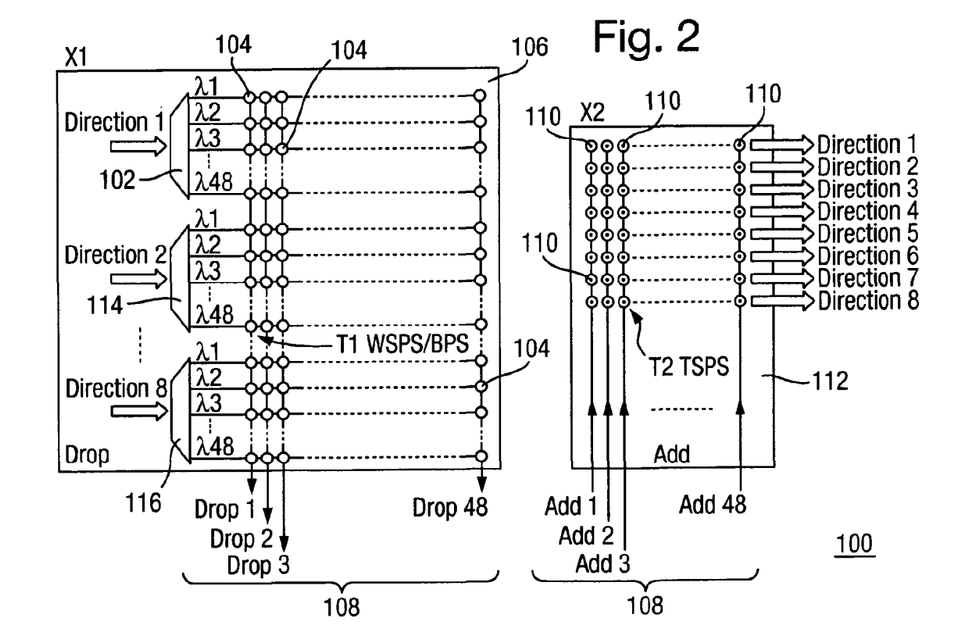
FIG. 2 is a diagram illustrating an Add and Drop Switch/Aggregator apparatus in a first embodiment of the present invention.

A complete ADSA optical switching sub-system, whose architecture in one embodiment of the present invention is shown in FIG. 2, can be implemented with the basic switching elements described above. It can be constructed by monolithic integration in which all functions are integrated in the same InP (indium phosphide) or silicon or other semiconductor materials based die, or by hybrid integration in which different chips are interconnected, each one of them implementing some functions in a more convenient way. Integrating all functions in one InP or other semiconductor die is a preferred embodiment, however in alternative embodiments various functions of an ADSA optical switching sub-system can be implemented in several connected semiconductor dies.

The device in the embodiment illustrated in FIG. 2 contains by two functional blocks or sub-devices:
- a first switching matrix, 106, that handles the drop wavelengths;
- a second switching matrix, 112, that handles the add wavelengths.

The first switching matrix, 106, comprises N AWG (arrayed waveguide grating) demultiplexers and a matrix with dimension NK×M where M is the number of drop channels (typically 25% of the input capacity: NK/4), and K is the number of wavelengths used in the system and N is the number of directions from/to which the wavelengths are received/sent to. The function of this matrix is to drop to transponder, in a colourless, directionless and contentionless way the channels that are not routed in by-pass by the first switching matrix 106.

The second switching matrix, 112, has dimension N×M. The function of this matrix is to add, in a colourless, directionless and contentionless way, local wavelength channels from the transponders 108.

In one embodiment the ADSA 100 illustrated in FIG. 2 comprises a demultiplexer 102 and two matrices: the first switching matrix 106 and the second switching matrix 112. The first switching matrix, 106, uses a first plurality of drop optical switches 104 for dropping wavelength channels. The drop optical switches 104 are arranged in the first switching matrix 106 with a number of rows that corresponds to a number of output ports of the AWG demultiplexer, 102, and a number of columns corresponding to a number of transponders 108. Each drop switch has an express input port 502 associated with a single output port of the demultiplexer, a drop output port, 504, associated with an individual transponder and an express output port 506. In one embodiment as the drop optical switch 104 the switch T1 is implemented.

The second switching matrix 112 of the ADSA 100 is for adding wavelength channels. The second switching matrix 112 comprises a second plurality of add optical switches 110. Each add optical switch 110 has an express input port 602 adapted to receive a comb of wavelengths, an add input port 604 adapted to receive a single wavelength to be added to the comb of wavelengths and an output port 606. The add optical switch 110 also comprises a second output port 608 used to output a single wavelength received at the add input port 604, that is not to be added to the comb of wavelength at the express input port 602. The second switching matrix 112 comprises a number of columns that corresponds to the number of transponders. In one embodiment as the add optical switch the switch T2 is used.

In one embodiment the drop optical switch 104 may be equipped with only three ports: the express input port 502, drop output port, 504, and express output port 506. In this implementation the drop output port is connected directly to a corresponding transponder. Alternatively, the drop optical switch comprises a fourth port: a second input port 508 adapted to receive a single wavelength from a drop output port of a corresponding drop optical switch located in a row immediately above. In this way a drop wavelength can be propagated vertically in the matrix 106 towards the associated transponder and only the bottom drop optical switch of the matrix is directly connected to the transponder 108.

Figure 3:
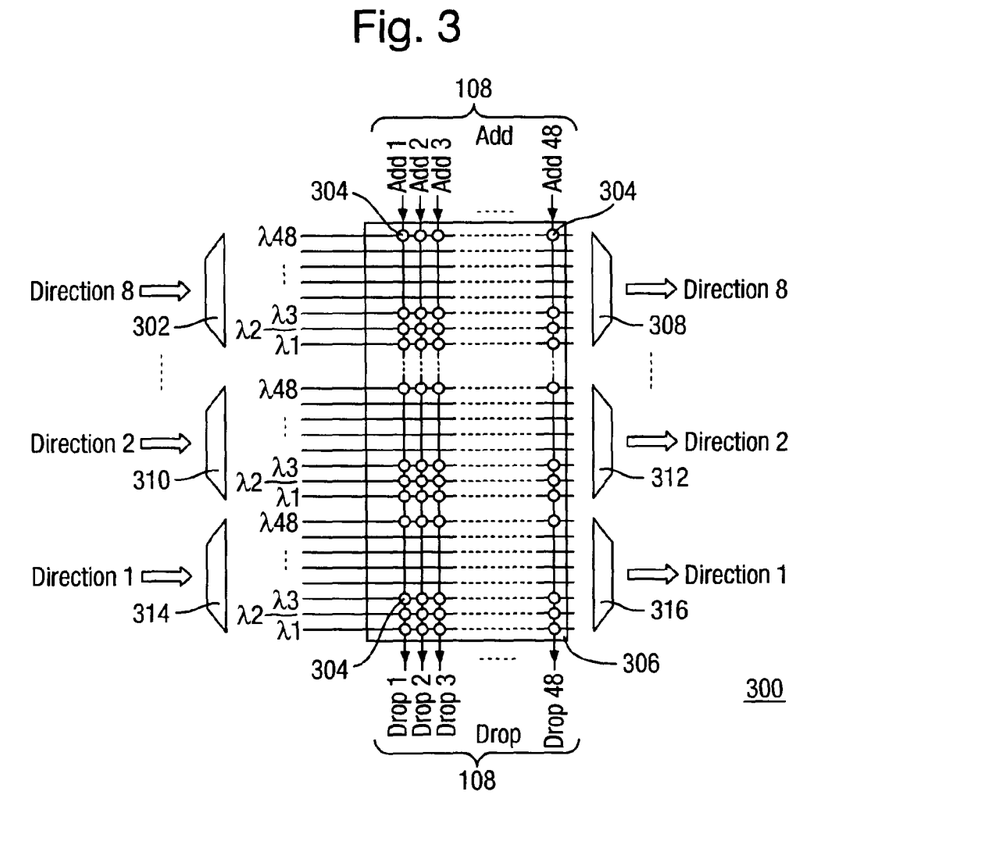
FIG. 3 is a diagram illustrating an Add and Drop Switch/Aggregator apparatus in a second embodiment of the present invention.

In a second embodiment, illustrated in FIG. 3, an alternative second device architecture is presented. According to this architecture a third switching matrix 306 is used for both add and drop functions. In one embodiment the third matrix 306 has dimension N×K×M. The third matrix 306 is placed between AWG Mux, 302, 310, 314 and Demux 308, 312, 316. Tuneable transponders 108 are connected at the top of the matrix and the wavelength to be added proceeds vertically crossing many switching elements until it is eventually switched by the elementary switch with the same colour of the wavelength as the wavelength to be added and, in corresponding with the Mux, direction to which the wavelength has to be added.

For drop function the wavelengths to be dropped are first demuxed by the AWGs, e.g. 302, and then the single wavelengths proceed horizontally until they are eventually switched by switch elements 304 in correspondence with receivers of the transponders to which the wavelengths have to be dropped. The transponders 108 are connected at the bottom of the third switch matrix 306 as shown in FIG. 3. For this architecture the switch elements 304 to be used are of the single type T1. The Wavelength Selective Photonics Switch (WSPS) shown in FIG. 5c is driven to switch horizontally a certain resonant add wavelength that comes from top (from port 1, 508, to port 3, 506) and switches vertically the same drop wavelength that comes from its left (from port 2, 502, to port 4, 504). This is what is needed to add and drop on the same transponder the same wavelength to/from the same direction. Moreover any other resonant wavelength coming from a different direction when it passes through the switch element under consideration will be switched horizontally: this is needed because no other wavelength may be dropped on the transponder under consideration. The new wavelength will be switched horizontally and then switched vertically to another transponder.

Figure 4:
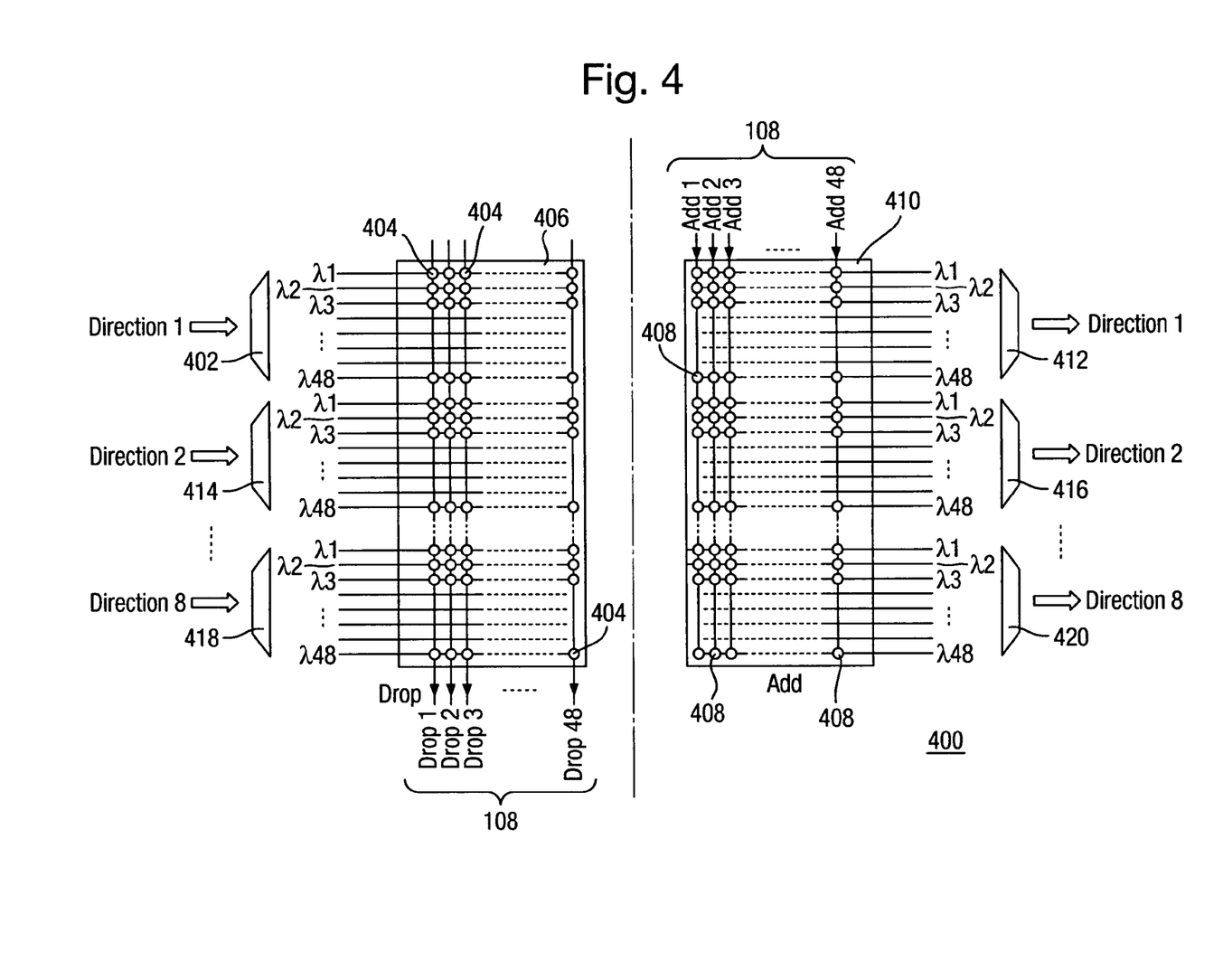
FIG. 4 is a diagram illustrating an Add and Drop Switch/Aggregator apparatus in a third embodiment of the present invention.

In a third embodiment, illustrated in FIG. 4, a third device architecture is shown. This embodiment is implemented by splitting the architecture of the third switching matrix in the second embodiment into two matrices, a fourth switching matrix 406 and a fifth switching matrix 410. The fourth switching matrix 406 is used for dropping wavelengths and the fifth switching matrix 410 for adding wavelengths. The elementary switches are the same used in the second embodiment and also the switch matrices size.

The device 400 illustrated in FIG. 4 further comprises an AWG demux 402, 414, 418 and an AWG Mux 412, 416 and 420.

The difference in implementation and operation of the device 400 compared with the device 300 is that there is a clear separation of the add and drop functions in the Add and Drop Switch and Aggregator device 400. The fourth switching matrix 406 is built of the same elementary switching elements of the type T1 as the third switching matrix 306 illustrated in FIG. 3. However, in the fourth switching matrix 406 the individual elements 404 are used only as drop switches with no add wavelength supplied. In the fifth switching matrix 410 the same elementary switching element, T1, is used, but this is an add matrix and so no wavelength is dropped and the individual switching elements 408 operate as add switches.

The embodiment illustrated in FIG. 4 is more expensive than the one illustrated in FIG. 3 because of the doubled number of the elementary switching elements T1 and bigger footprint required for implementation. The embodiment illustrated in FIG. 4 has some advantages, however, and these include simpler control and less demanding specification in term of crosstalk. In the embodiment of FIG. 3 both the add and drop functions are implemented in the same device and if the dropped signal is not completely rejected by the elementary switch a crosstalk may be generated to the corresponding added channel while in the embodiment of FIG. 4 the add and drop functions are separated and there is not any possibility to degrade the quality of the added signal.

In an alternative embodiment an apparatus, 400, for an optical communications network comprises a demultiplexer, 402, a fourth switching matrix, 406, a fifth switching matrix, 410, and a multiplexer, 412. The fourth switching matrix, 406, comprises a plurality of drop optical switches, 404, for dropping wavelength channels. The drop optical switches are arranged in the fourth matrix, 406, with a number of rows corresponding to a number of output ports of the demultiplexer, 402, and a number of columns corresponding to a number of transponders, 108, wherein each drop optical switch, 404, has an express input port, 502, associated with an output port of the demultiplexer, a drop output port, 504, associated with an individual transponder and an express output port, 506. The fifth switching matrix, 410, comprises a plurality of add optical switches, 408, for adding wavelength channels. The add optical switches are arranged in the fifth matrix, 410, with a number of rows corresponding to a number of output ports of the demultiplexer, 402, and a number of columns corresponding to a number of transponders, 108, wherein each add optical switch has an express input port, 502, an add input port, 508, associated with an individual transponder and an express output port, 506. The multiplexer, 412, has a plurality of input ports associated with express output ports of the add/drop optical switches.

Figure 1:
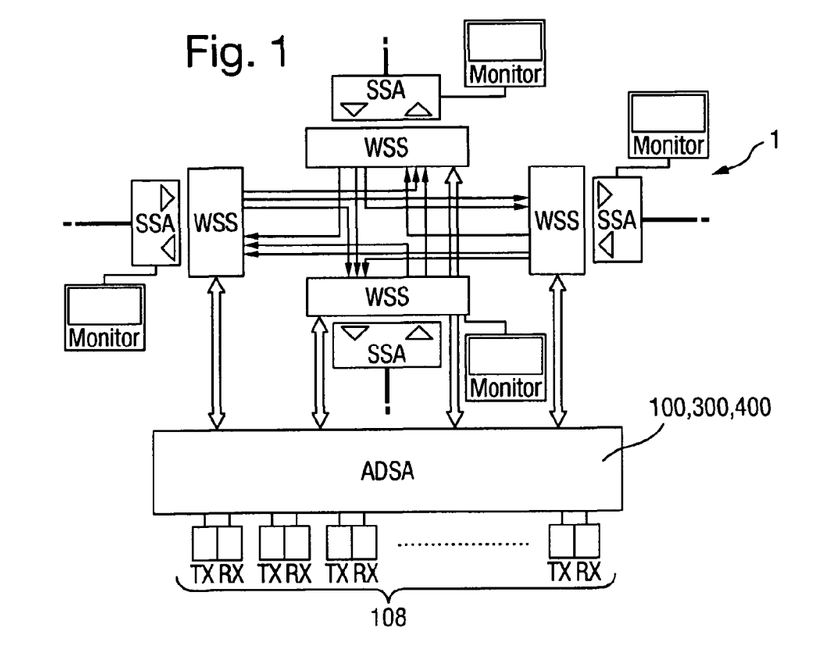
FIG. 1 is a diagram illustrating a basic architecture of a ROADM.

In one embodiment the Add and Drop Switch and Aggregator (ADSA) 100, 300, 400 apparatus as illustrated in any of the FIGS. 1-4 does not include transponders 108 and as clearly illustrated in FIG. 1 the transponders 108 are separate from the ADSA. However, in alternative embodiments, not shown, the transponders 108 are integrated with the ADSA 100, 300, 400.

As illustrated in FIG. 1 and described above, the present invention in its various embodiments provides a Reconfigurable Optical Add-Drop Multiplexer, 1, with an Add and Drop Switch and Aggregator, 100, 300 or 400.

Figure 7:
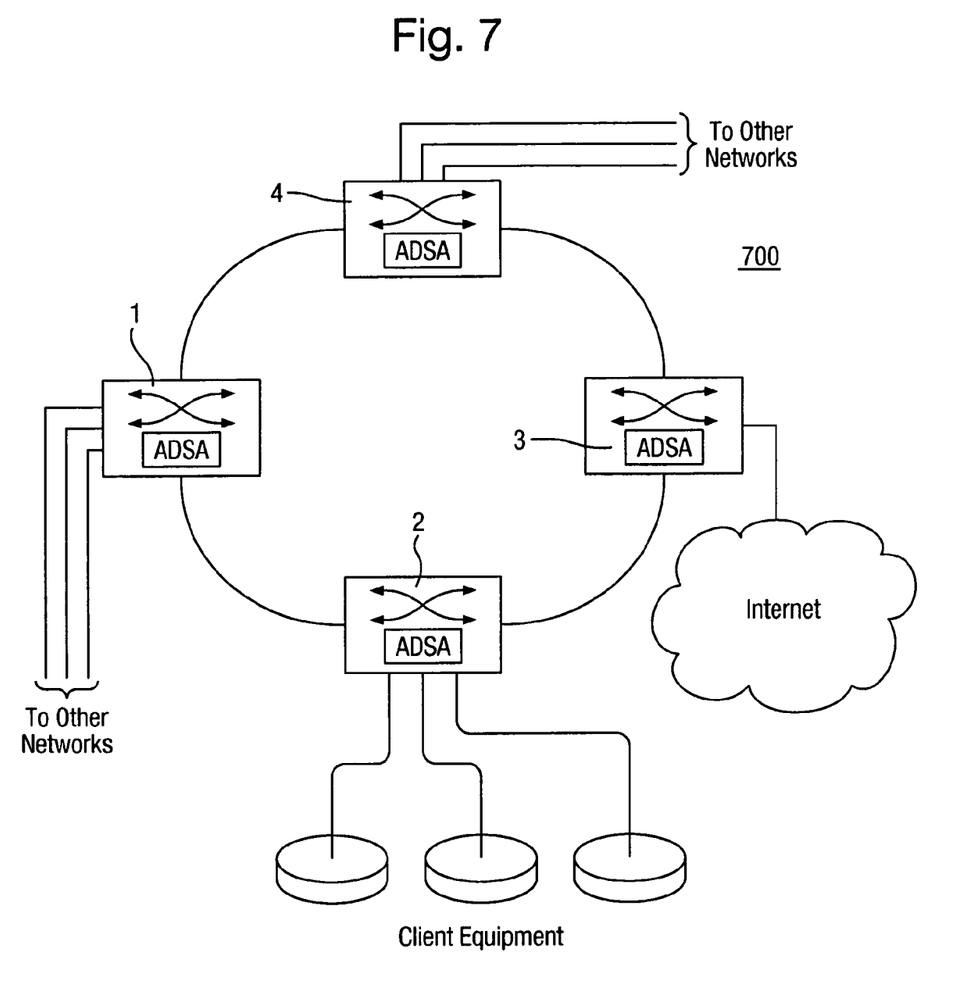
FIG. 7 is a diagram illustrating a communication network in one embodiment of the present invention.

FIG. 7 illustrates one embodiment of a telecommunications network 700 using a Reconfigurable Optical Add-Drop Multiplexer, 1, with an Add and Drop Switch and Aggregator, 100, 300 or 400, described earlier. The illustrated example shows a ring type network with ROADM 1-4 and each of them having implemented an Add and Drop Switch and Aggregator as described above. Connections of the ROADMs 1-4 of the network 700 to other networks or elements are also illustrated (illustrating in a simplified way the multi-directional ROADMs), but for the sake of brevity will not be described here.

Various embodiments of the Add and Drop Switch and Aggregator 100, 300 and 400 were presented and for the sake of brevity their description will not be repeated.

The novel Add and Drop Switch and Aggregator device presented here allows implementing a ROADM node with colourless, directionless and contentionless characteristics featuring low power consumption, low cost, high compactness and simple installation (low interconnection complexity).

The invention claimed is:

1. An apparatus for an optical communications network, the apparatus comprising:
a demultiplexer;
a first plurality of drop optical switches configured to drop wavelength channels, wherein the first plurality of drop optical switches are arranged in a first matrix with a number of rows corresponding to a number of output ports of the demultiplexer and a number of columns corresponding to a number of transponders, wherein each drop optical switch has an express input port associated with a single output port of the demultiplexer, a drop output port associated with an individual transponder, and an express output port; and
a second plurality of add optical switches arranged in a second matrix, configured to add wavelength channels, wherein each add optical switch has an express input port adapted to receive a comb of wavelengths, an add input port adapted to receive a single wavelength to be added to the comb of wavelengths, and an output port, wherein the second matrix comprises a number of columns corresponding to the number of transponders.

2. The apparatus according to claim 1, wherein each of the drop optical switches comprises a second input port adapted to receive a single wavelength from the drop output port of a corresponding drop optical switch located in a row immediately above.

3. The apparatus according to claim 1, wherein each drop output port of the drop optical switches is directly connected to a transponder.

4. The apparatus according to claim 3, further comprising a plurality of demultiplexers, each of the plurality of demultiplexers adapted to receive a wavelength multiplex from a different direction, wherein each row of the second matrix is adapted to receive a comb of wavelengths output by the express output ports of the first matrix associated with an individual demultiplexer.

5. The apparatus according to claim 4, wherein the transponders are separate from the apparatus.

6. The apparatus according to claim 4, wherein the transponders are integrated with the apparatus.

7. An apparatus for an optical communications network, the apparatus comprising:
a demultiplexer;
a plurality of add and drop optical switches arranged in a switching matrix with a number of rows corresponding to a number of output ports of the demultiplexer and a number of columns corresponding to a number of transponders, each of the plurality of add optical switches configured to add wavelength channels, each of the plurality of drop optical switches configured to drop wavelength channels, wherein each of the plurality of drop optical switches has an express input port associated with an output port of the demultiplexer, a drop output port associated with an individual transponder, and an express output port, and wherein each of the plurality of add optical switches has an express input port, an add input port associated with an individual transponder, and an express output port, wherein the switching matrix is split into two switching matrices; a switching matrix for dropping wavelengths and a switching matrix for adding wavelengths, wherein:
the switching matrix for dropping wavelengths comprises a plurality of drop optical switches configured to drop wavelength channels, wherein the drop optical switches are arranged in the switching matrix for dropping wavelengths with a number of rows corresponding to a number of output ports of the demultiplexer and a number of columns corresponding to a number of transponders, wherein each drop optical switch has an express input port associated with an output port of the demultiplexer, a drop output port associated with an individual transponder, and an express output port, and
the switching matrix for adding wavelengths comprises a plurality of add optical switches configured to add wavelength channels, wherein the add optical switches are arranged in the switching matrix for adding wavelengths with a number of rows corresponding to a number of output ports of the demultiplexer and a number of columns corresponding to a number of transponders, wherein each add optical switch has an express input port, an add input port associated with an individual transponder, and an express output port; and a multiplexer with a plurality of input ports associated with express output ports of the plurality of add and drop optical switches.

8. The apparatus according to claim 7, further comprising a plurality of demultiplexer and multiplexer pairs, each demultiplexer adapted to receive a wavelength multiplex from a different direction, and each multiplexer adapted to output a multiplex in a different direction.

9. The apparatus according to claim 7, wherein each of the drop optical switches comprises a second input port adapted to receive a single wavelength from the drop output port of a corresponding drop optical switch located in a row immediately above.

10. The apparatus according to claim 7, wherein each drop output port of the drop optical switches is directly connected to a transponder.

11. The apparatus according to claim 10, further comprising a plurality of demultiplexer and multiplexer pairs, each demultiplexer adapted to receive a wavelength multiplex from a different direction, and each multiplexer adapted to output a multiplex in a different direction.

12. The apparatus according to claim 11, wherein the transponders are separate from the apparatus.

13. The apparatus according to claim 11, wherein the transponders are integrated with the apparatus.

14. A reconfigurable optical add-drop multiplexer, the reconfigurable optical add-drop multiplexer comprising an apparatus, wherein the apparatus comprises:
a demultiplexer;
a first plurality of drop optical switches configured to drop wavelength channels, wherein the first plurality of drop optical switches are arranged in a first matrix with a number of rows corresponding to a number of output ports of the demultiplexer and a number of columns corresponding to a number of transponders, wherein each drop optical switch has an express input port associated with a single output port of the demultiplexer, a drop output port associated with an individual transponder, and an express output port; and
a second plurality of add optical switches arranged in a second matrix, configured to add wavelength channels, wherein each add optical switch has an express input port adapted to receive a comb of wavelengths, an add input port adapted to receive a single wavelength to be added to the comb of wavelengths, and an output port, wherein the second matrix comprises a number of columns corresponding to the number of transponders.

15. A telecommunications network comprising an apparatus, wherein the apparatus comprises:
a demultiplexer;
a first plurality of drop optical switches configured to drop wavelength channels, wherein the first plurality of drop optical switches are arranged in a first matrix with a number of rows corresponding to a number of output ports of the demultiplexer and a number of columns corresponding to a number of transponders, wherein each drop optical switch has an express input port associated with a single output port of the demultiplexer, a drop output port associated with an individual transponder, and an express output port; and
a second plurality of add optical switches arranged in a second matrix, configured to add wavelength channels, wherein each add optical switch has an express input port adapted to receive a comb of wavelengths, an add input port adapted to receive a single wavelength to be added to the comb of wavelengths, and an output port, wherein the second matrix comprises a number of columns corresponding to the number of transponders.

* * * * *

UNITED STATES PATENT AND TRADEMARK OFFICE
CERTIFICATE OF CORRECTION

PATENT NO.        : 9,112,636 B2  
APPLICATION NO.   : 14/116726  
DATED             : August 18, 2015  
INVENTOR(S)       : Testa et al.

Page 1 of 1

It is certified that error appears in the above-identified patent and that said Letters Patent is hereby corrected as shown below:

In the Specification

In Column 6, Line 53, delete "elements 404" and insert -- elements 408 --, therefor.

In the Claims

In Column 8, Line 51, in Claim 7, delete "matrices;" and insert -- matrices: --, therefor.

Signed and Sealed this  
Fifteenth Day of March, 2016

Michelle K. Lee  
*Director of the United States Patent and Trademark Office*